(12) United States Patent
Bannur Subraya et al.

(10) Patent No.: US 11,231,872 B2
(45) Date of Patent: Jan. 25, 2022

(54) IDENTIFICATION OF SUBSTITUTE CONTROLLERS BASED ON TEMPERATURE DATA

(71) Applicant: Hewlett Packard Enterprise Development LP, Houston, TX (US)

(72) Inventors: Sumangala Bannur Subraya, Bengaluru (IN); Vellalore Sreenivasa Prasad, Bangalore (IN); Vasundhara Gurunath, Bangalore (IN); Paulose Kuriakose Arackal, Cochin (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 354 days.

(21) Appl. No.: 16/200,914

(22) Filed: Nov. 27, 2018

(65) Prior Publication Data

US 2020/0012452 A1 Jan. 9, 2020

(30) Foreign Application Priority Data

Jul. 5, 2018 (IN) .............................. 201841025212

(51) Int. Cl.
*G06F 3/06* (2006.01)
(52) U.S. Cl.
CPC .......... *G06F 3/0659* (2013.01); *G06F 3/0611* (2013.01); *G06F 3/0683* (2013.01)
(58) Field of Classification Search
CPC ...... G06F 9/4411; G06F 9/5016; G06F 9/544; G06F 11/3006; G06F 11/3037;
(Continued)

(56) References Cited

U.S. PATENT DOCUMENTS 7,398,421 B1  7/2008  Limaye et al.
7,533,169 B1  5/2009  Gold et al.
(Continued)

OTHER PUBLICATIONS

Intel Corporation, "Intel® EP80579 Integrated Processor with Intel® QuickAssist Technology Development Kit," Oct. 2008, User's Guide, <http://static6.arrow.com/aropdfconversion/479f609ceadeb4c986a3c1cb7e271c7369f91185/320067.pdf>.
(Continued)

*Primary Examiner* — Aracelis Ruiz
(74) *Attorney, Agent, or Firm* — Hewlett Packard Enterprise Patent Department

(57) ABSTRACT

Storage system comprises a cluster of storage controllers communicatively coupled to a storage device. Each storage controller is associated with a storage namespace in the storage device to process I/O operations of associated storage namespace. An I/O processing engine allocates I/O queues to each storage controller from the cluster of storage controllers for processing I/O operations of the associated storage namespace. The I/O processing engine is to identify a heated controller from the cluster of storage controllers based on temperature data corresponding to the cluster of storage controllers and suspend I/O queues handled by the heated controller. The I/O processing engine is to select a substitute controller based on the temperature data, associate the substitute controller with the storage namespace of the heated controller and allocate additional I/O queues to the substitute controller for processing the I/O operations for the storage namespace.

20 Claims, 5 Drawing Sheets

(58) Field of Classification Search
CPC ............ G06F 12/0607; G06F 12/0837; G06F 12/0882; G06F 12/1054; G06F 12/1063; G06F 3/061; G06F 3/0611; G06F 3/0635; G06F 3/0659; G06F 3/0671; G06F 3/0683

See application file for complete search history.

(56) References Cited

U.S. PATENT DOCUMENTS

| | | | |
|---|---|---|---|
| 8,843,789 | B2 | 9/2014 | Sandstrom et al. |
| 8,984,220 | B1 | 3/2015 | Gill et al. |
| 9,143,435 | B1 | 9/2015 | Ramamoorthy et al. |
| 10,509,706 | B2 | 12/2019 | Agarwal et al. |
| 10,841,169 | B2 | 11/2020 | Puttagunta et al. |
| 2004/0037277 | A1 | 2/2004 | Mathews et al. |
| 2005/0278520 | A1* | 12/2005 | Hirai ............... G06F 9/4893 713/1 |
| 2008/0250042 | A1 | 10/2008 | Mopur et al. |
| 2012/0278584 | A1 | 11/2012 | Nagami et al. |
| 2013/0111077 | A1 | 5/2013 | Gowravaram et al. |
| 2014/0351545 | A1 | 11/2014 | Nakajima |
| 2016/0149639 | A1 | 5/2016 | Pham et al. |
| 2016/0205008 | A1 | 7/2016 | Dasu et al. |
| 2016/0253186 | A1 | 9/2016 | Brown |
| 2016/0320971 | A1 | 11/2016 | Postavilsky et al. |
| 2016/0350117 | A1* | 12/2016 | Muller ............ G06F 11/3433 |
| 2017/0003889 | A1 | 1/2017 | Kim et al. |
| 2017/0168730 | A1 | 6/2017 | Chiu et al. |
| 2017/0177045 | A1 | 6/2017 | Seo et al. |
| 2017/0177216 | A1 | 6/2017 | Freyensee et al. |
| 2018/0219755 | A1 | 8/2018 | Agarwal et al. |
| 2019/0043559 | A1* | 2/2019 | McVay ............ G06F 3/0634 |

OTHER PUBLICATIONS

Berktold et al., "CPU Monitoring With DTS/PECI," Sep. 2010, <https://www.intel.com/content/dam/www/public/us/en/documents/white-papers/cpu-monitoring-dts-peci-paper.pdf>.

Intel Corporation, "Techniques for Lowering Power Consumption in Design Utilizing the Intel® EP80579 Integrated Processor Product Line," Application Note, Feb. 2010, <https://www.intel.com/content/dam/www/public/us/en/documents/application-notes/techniques-lowering-power-ep80579-note.pdf>.

Intel Corporation, "Utilizing IEEE 1588 with Intel® EP80579 Integrated Processor Product Line," Application Note, May 2009, <https://www.intel.in/content/www/in/en/intelligent-systems/tolapai/utilizing-ieee-1588-ep80679-note.html>.

Intel Corporation, Excerpts from: "Intel® EP80579 Integrated Processor Product Line," Aug. 2009, Datasheet, pp. 1-2, 1911-1916, <https://www.intel.com/content/www/us/en/intelligent-systems/tolapai/ep80579-product-line-datasheet.html>.

Seagate Technology LLC, "Cheetah 15K.6 FC," Product Manual, 100465943, Rev. A, Oct. 2007, <https://www.seagate.com/staticfiles/support/disc/manuals/enterprise/cheetah/15K.6/FC/100465943a.pdf>.

Smith, L., "Samsung 950 PRO M.2 SSD Review", Oct. 22, 2015, 10 pages, http://www.storagereview.com/samsung_950_pro_m2_ssd_review.

Allen et al., "The Evolution and Future of NVMe™", NVM Express, 2017, 42 pages.

Brocade Communications Systems, Inc., "Brocade 6520, 6510, and 6505 Switches Frequently Asked Questions," Jun. 2015, 14 pages.

Fujitsu Limited, "Brocade 6505 Fibre Channel switch," Oct. 1, 2012, Datasheet, 5 pages.

Fujitsu Limited, "Brocade 6520 Fibre Channel switch," Feb. 18, 2013, Datasheet, 7 pages.

Jcason, "Brocade Diagnostic Port Testing," Feb. 28, 2014, 5 pages.

Oracle, "Brocade 6510 Fibre Channel Switch," 2012, 6 pages.

Sebastian Thale, "Things I like in Brocade FOS 7.0—Part 1: The D-Port," Sep. 15, 2011, 4 pages.

Singh, A et al., "Zodiac: Efficient Impact Analysis for Storage Area Networks." (Research Paper), Proceedings of the 4th Conference on USENIX Conference on File and Storage Technologies, Oct. 9, 2005, vol. 4, 21 pages, available at http://dl.acm.org/citation.cfm?id=1251034.

* cited by examiner

IDENTIFICATION OF SUBSTITUTE CONTROLLERS BASED ON TEMPERATURE DATA

PRIORITY INFORMATION

This application claims priority to India Application No. 2018/41025212, filed on Jul. 5, 2018. The contents of which are incorporated herein by reference in its entirety.

BACKGROUND

Storage systems provide storage which may be used for supporting a computing environment. The storage systems include multiple storage devices for storage of data processed and generated during operation of computing devices associated with the computing environment. The storage systems further include host operating systems implementing Input-output (I/O) processing units for managing I/O operations, such as data access and storage on the storage devices. To interface the storage devices with the I/O processing unit, storage controllers, such as host bus adapters (HBA) implementing a Non-Volatile Memory (NVM) Express (NVMe) Flash protocol are used. Each storage controller is associated with a storage namespace on the storage device to process I/O operations for the associated storage namespace.

BRIEF DESCRIPTION OF DRAWINGS

The detailed description is described with reference to the accompanying figures. It should be noted that the description and figures are merely example of the present subject matter and are not meant to represent the subject matter itself.

DETAILED DESCRIPTION

Figure 1:
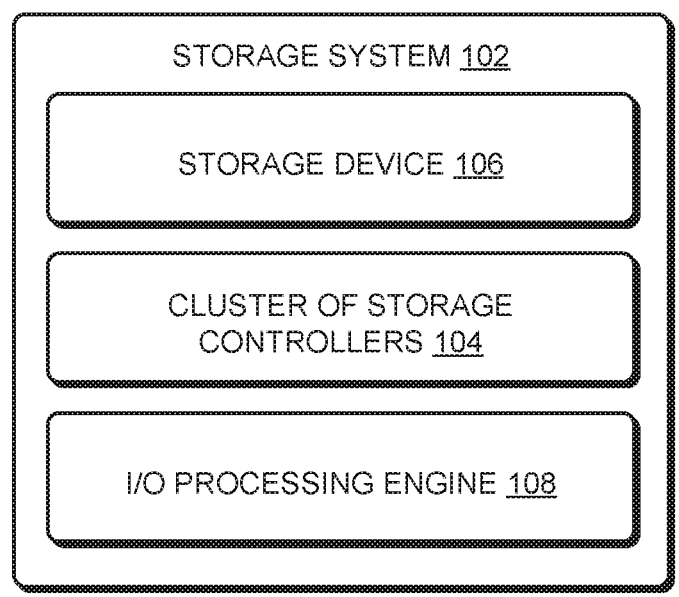
FIG. 1 illustrates a block diagram of a storage system, according to an example of the present subject matter.

The subject matter relates to storage systems having multiple storage devices and host operating systems implementing Input-output (I/O) processing units for managing I/O operations, such as data access and storage on the storage devices. The storage systems further include storage controllers, such as host bus adapters (HBA), to interface the storage devices with the I/O processing unit. In one example, the storage controllers implement a Non-Volatile Memory Express (NVMe) Flash protocol. Each storage controller is associated with a storage namespace on the storage device to process I/O operations for the associated storage namespace. The storage controllers may receive commands and/or data from the I/O processing unit and forward the commands and/or data over a serial link or a parallel link to the storage devices, using peripheral component Interconnect express (PCIe) based standard. In a similar manner, the storage controllers also receive responses to the command and/or data from the storage device over the serial or parallel link and send the response and/or data to the I/O processing unit. Further, the I/O processing unit may allocate and/or reallocate I/O queues to each of the storage controllers for processing the I/O operations of the associated storage namespace.

During the I/O operations, the storage devices and the storage controllers consume power and generate heat. Owing to continuous running and sustained workloads, the storage controllers and peripherals may generate excessive heat exceeding a safe operating temperature of the storage controllers. Overheating of the storage controller, such as non-volatile memory Non-Volatile Memory Express (NVMe) controllers may result in a thermal throttling of the storage controller by the the I/O processing unit and storage controller firmware. The thermal throttling may lead to degraded performance and malfunctioning of the storage controllers, when the storage controllers are continued to be used for further IO operations. Further, since the storage controllers are typically clustered together and installed in storage bays inside the storage system, collective heat inside the storage bays may further effect the storage controllers installed in the storage bays. To enable a user or the host operating systems to monitor temperature conditions of the storage controllers, temperature sensors are associated with each storage controller. In a conventional technique, the storage controller may generate an asynchronous event notification whenever the temperature of the storage controller may exceed the safe operating temperature. The asynchronous event notification may be provided to the host operating system for corrective actions. However, in case a user of the storage system fails to take the corrective action, the storage controller may overheat and malfunction.

At times, two or more storage controllers may be collectively associated with two or more storage namespaces for processing the I/O operations. In case of overheating of a first storage controller, the I/O processing unit may re-route I/O instructions and queries associated with the first storage controller to a second storage controller that shares common storage namespaces with the first storage controller. However, the I/O processing unit may re-route the I/O instructions upon a complete shutdown of the first storage controller. Delaying the re-routing till the complete shutdown may, however, effect the performance of the first storage controller as the performance of a storage controller may start degrading once the temperature of the storage controller exceeds the safe operating temperature before shutdown. Further, overheating of the first storage controller may increase the overall heat within the storage bays, thereby, further effecting the temperature conditions of other storage controllers of the storage bay of the first storage controller. Further, since the I/O instructions corresponding to the first storage controller are re-routed to the second storage controller by default, without updating the I/O queues or diagnosing working conditions of the second storage controller, re-routing the I/O instructions may lead to overloading and subsequently overheating of the second storage controller.

The present subject matter discloses example implementations of techniques for managing heated storage controllers in a cluster of storage controllers in a storage system. In one example, the storage Controller may be a Non-Volatile Memory Express (NVMe) controller. In accordance to the present subject matter, an I/O processing engine of the storage system is to monitor temperature conditions of the duster of storage controllers to identify a heated controller having a current temperature value above a threshold temperature value. On identifying the heated controller, the I/O processing engine may suspend I/O queues associated with the heated controller. Further, the I/O processing engine may identify a substitute controller having a minimum temperature value in the duster of storage controllers and associate the substitute controller with a storage namespace currently associated with the heated controller. The I/O processing engine may further allocate additional I/O queues to the substitute controller for processing the I/O operations for the storage namespace. The I/O processing engine may thus dynamically identify the heated controller and transfer load to an optimally operational storage controller via additional I/O queues, thereby, avoiding overloading of the I/O queues of the substitute controller.

In one example implementation, the storage system may include a storage device having multiple storage namespaces. The storage system may further include the cluster of storage controllers associated with the storage namespaces in the storage device such that each storage controller is to process I/O operations corresponding to a storage namespace associated with the storage controller. In one example, the cluster of storage controllers may further include sub-clusters such that the storage clusters may be further grouped into smaller sub-clusters within the duster of storage controllers.

Further, the I/O processing engine may be communicatively coupled to the storage controllers to allocate I/O queues to each of the storage controllers for processing the I/O operations of the associated storage namespace. In one example implementation, the I/O processing engine may monitor the temperature conditions of the duster of storage controllers and periodically obtain a current temperature value of each of the storage controllers. The I/O processing engine may then compare the current temperature value of each storage controller with the threshold temperature value to identify the heated controller having the current temperature value greater than the threshold temperature value. The I/O processing engine may subsequently suspend the I/O queues handled by the heated controller.

The I/O processing engine may further identify a storage controller having the minimum current temperature value from among the duster of storage controllers. The storage controller having the minimum current temperature value may be selected as the substitute controller for re-routing I/O queues of the heated controller. The I/O processing engine may initially rank the current temperature values corresponding to the storage controllers that are associated with the duster of storage controller and have the current temperature value less than the threshold temperature value. The I/O processing engine may subsequently identify the storage controller having the minimum current temperature value as the substitute controller.

In one example, the I/O processing engine may initially search for the substitute controller within a first sub-duster of the heated controller. In case none of the storage controllers of the first sub-duster is identified as the substitute controller, the I/O processing engine may search for the substitute controller within other sub-dusters. In another example, the I/O processing engine may search for the substitute controller within entire duster of the storage controllers. Further, in one example, in case more than one storage controllers have the minimum temperature value, all such storage controllers may be combined to operate as the substitute controller, thereby dividing the load of the heated controller across multiple storage controllers.

Further, the I/O processing engine associates the substitute controller with the storage namespace associated with the heated controller. The I/O processing engine may further allocate additional I/O queues to the substitute controller and re-route data and commands related to I/O operations for the storage namespace associated with the heated controller to the substitute controller using the additional I/O queues. Further, the I/O processing engine may monitor the temperature conditions of the heated controller and re-activate the suspended I/O queues once a temperature value of the heated controller reduces to a value below the threshold value.

The present subject matter thus describes techniques for automatically identifying the heated controller and transferring load of the heated controller to an optimally operational storage controller. Since the data and commands related to I/O operations for the storage namespace associated with the heated controller are re-routed to the substitute controller using additional I/O queues, therefore, existing I/O queues of the substitute controller are not overloaded. Further, since the heated controller is timely identified and suspended, the performance of the heated controller is not effected. Further, transferring the load of the heated controller to a storage controller having the minimum temperature value helps in ensuring that the substitute controller is not quickly overheated. Additionally, monitoring the temperature conditions of the heated controller to re-activate the suspended I/O queues once the temperature value of the heated controller reduces below the threshold value helps in ensuring that the substitute controller is not overloaded and overheated.

The present subject matter is further described with reference to FIGS. 1 to 5. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of a storage system 102, according to an example of the present subject matter. Examples of the storage system 102 include, but are not limited to, mainframe computers, servers, network servers, storage arrays, and data repositories. In one example implementation of the present subject matter, the storage system 102 includes a cluster of storage controllers 104 associated with a storage device 106. In one example, the cluster of storage controllers 104 may include multiple storage controllers, with each storage controller being associated with a storage namespace in the storage device 106. Each storage controller may process input/output (I/O) operations corresponding to the associated storage namespace.

In one example, the storage device 106 may have a single storage disk having multiple storage namespaces. In another example, the storage device 106 may have multiple storage disks, with the storage namespaces being hosted across the multiple storage disks in a distributed computing environment. Further, examples of the storage controllers include, but are not limited to host bus adapters (HBA) implementing a Non-Volatile Memory (NVM) Express (NVMe) Flash protocol.

The storage system 102 may further include an I/O processing engine 108 associated with the duster of storage controllers 104 for managing the cluster of storage controllers 104. In one example, the I/O processing engine 108 may allocate I/O queues to each of the storage controllers from the cluster of storage controllers 104 for processing I/O operations of the associated storage namespace. In accordance to an example implementation of the present subject matter, the I/O processing engine 108 may monitor temperature conditions of the cluster of storage controllers 104 to identify thermal faults, such as overheating and take corrective measures for overheated storage controllers.

In one example, I/O processing engine 108 may initially identify a heated controller from the cluster of storage controllers 104 based on temperature data corresponding to the cluster of storage controllers 104. In one example, the heated controller may be a storage controller having temperature value greater than a threshold temperature value. The I/O processing engine 108 may then suspend I/O queues handled by the heated controller. Further, the I/O processing engine 108 may select a substitute controller, from the cluster of storage controllers 104, based on the temperature data. In one example, the substitute controller may be a storage controller having temperature value lesser than the threshold temperature value.

The I/O processing engine 108 may further associate the substitute controller with the storage namespace associated with the heated controller. Further, the I/O processing engine 108 may allocate additional I/O queues to the substitute controller for processing the I/O operations for the storage namespace associated with the heated controller.

Figure 2:
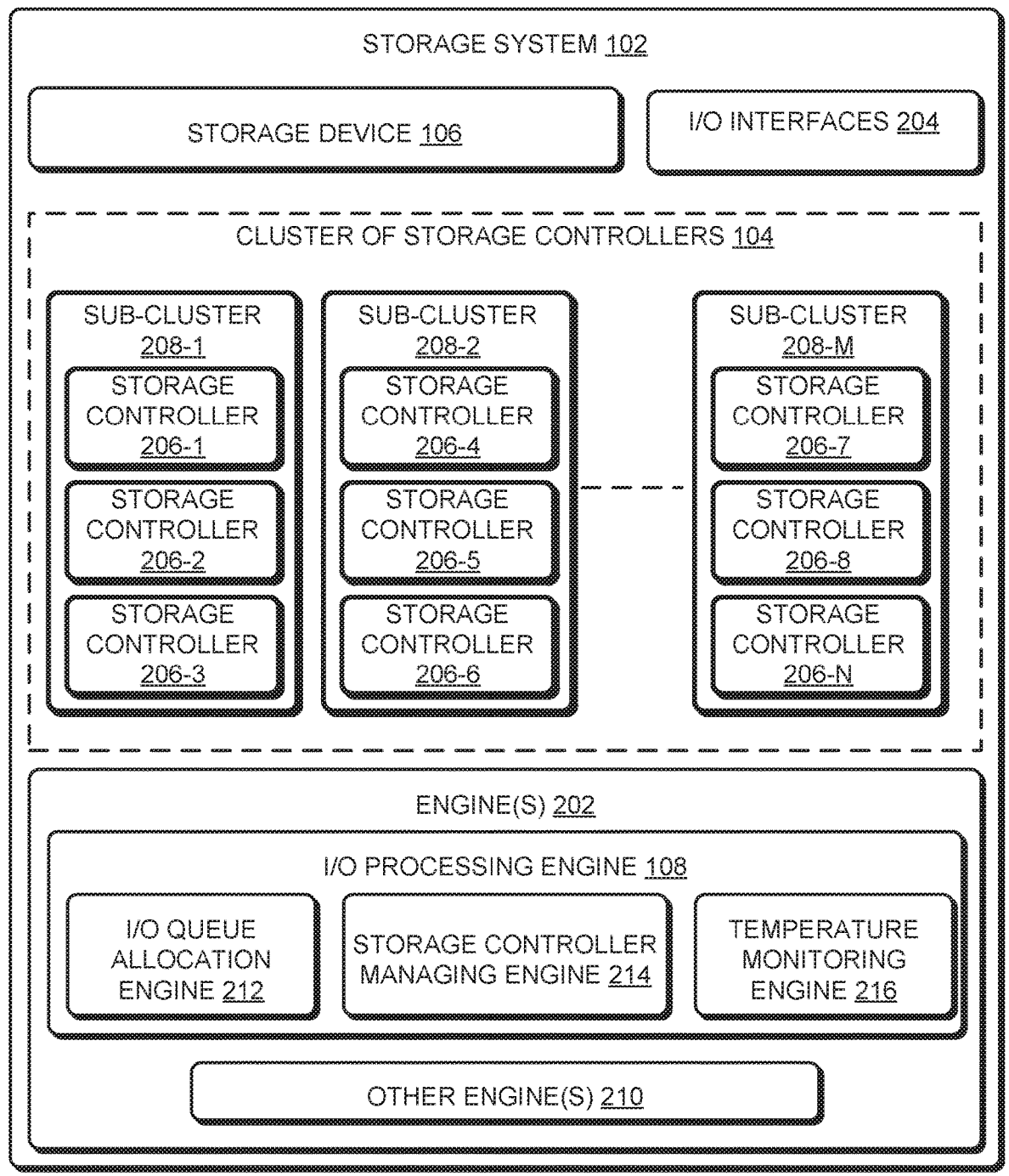
FIG. 2 illustrates a block diagram of the storage system, according to another example of the present subject matter.

FIG. 2 illustrates a block diagram of the storage system 102, according to another example of the present subject matter. The Storage system 102 may be implemented on a computing device, such as a mainframe computer, a server, a network server, a storage array, and a data repository. In one example, the storage system 102 may be associated with a computing environment and include the storage device 106 for storage of data processed and generated during operation of computing devices of the computing environment. The storage device 106 may be a storage media that may store data in the storage system 102. Examples of the storage device 106 include, but are not limited to, non-volatile memory compatible devices, such as a read-only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), nanowire memory, Ferro-electric Transistor Random Access Memory (FeTRAM)), Magnetoresistive Random Access Memory (MRAM), flash memory, Spin Torque Transfer Random Access Memory (STTRAM), Resistive Random Access Memory, byte addressable 3-Dimensional Cross Point Memory, and a PCM (Phase Change Memory).

In one example, the storage device 106 may include a single storage disk. In another example, the storage device 106 may include multiple storage disks. Further, multiple storage namespaces may be hosted on the storage device 106 for storing data related to different entities or processes. In one example, a storage namespace may be hosted on a single disk. In another example, a storage namespace may be hosted across the multiple storage disks in a distributed computing environment.

The storage system 102 further includes the cluster of storage controllers 104, engine(s) 202, and I/O interfaces 204, In accordance with an example implementation of the present subject matter, the cluster of storage controllers 104 includes a plurality of storage controllers 206-1, 206-2, 206-3, 206-4, 206-5, 206-6, 206-7, 206-8, . . . , 206-N. The storage controllers 206-1, 206-2, 206-3, 206-4, 206-5, 206-6, 206-7, 206-8, . . . , 206-N are hereinafter collectively referred to as storage controllers 206 and individually referred to as storage controller 206. As previously described, the cluster of storage controllers 104 may be associated with the storage namespaces in the storage device 106 such that each storage controller 206 is associated with a corresponding storage namespace. Each of the storage controllers 206 may process I/O operations corresponding to the associated storage namespace. Further, the storage controllers may be NVMe storage controllers implemented by host bus adapters implementing a NVMe Flash protocol.

In one example, one storage controller 206, say, the storage controller 206-1 may be associated with a single storage namespace. In another example, multiple storage controllers 206, say, the storage controllers 206-1 and 206-2 may be associated with a shared storage namespace. In another example, a storage controller 206 may be associated with more than one storage namespaces.

In accordance with an example implementation of the present subject matter, the cluster of storage controllers 104 may further include sub-clusters 208-1, 208-2, . . . , 208-M. The sub-clusters 208-1, 208-2, . . . , 208-M are hereinafter collectively referred to as sub-clusters 208 and individually referred to as sub-cluster 208. The storage controller 206 may thus be further grouped into smaller sub-clusters 208 within the cluster of storage controllers 104. For example, the storage controllers 206-1, 206-2, and 206-3 may be grouped into a first sub-cluster, say, the sub-cluster 208-1. The storage controllers 206-4, 206-5, and 206-6 may be grouped into a second sub-cluster, say, the sub-cluster 208-2. Further, the storage controller 206 may be installed into multiple storage bays of the storage system 102, with each storage bay housing a single sub-cluster 208 of the storage controllers 206. For example, the sub-cluster 208-1 may be housed in a first bay, the sub-cluster 208-2 may be housed in a second bay, and the sub-cluster 208-M may be housed in a third bay.

The I/O interfaces 204 may include a variety of interfaces, for example, interfaces for data input and output devices, referred to as I/O devices, storage devices, network devices, and the like. The I/O interfaces 204 facilitate communication between the storage system 102 and various other computing devices connected in a networked environment. The I/O interfaces 204 may also provide a communication pathway for one or more components of the storage system 102. Examples of such components include, but are not limited to, input device, such as keyboards, computer mice, and a touch enabled graphical user interface.

The engine(s) 202 (including I/O processing engine 108 of FIGS. 1 and 2) may be implemented as a combination of hardware and programming (for example, programmable instructions) to implement one or more functionalities of the engine(s) 202. In examples described herein, such combinations of hardware and programming may be implemented in several different ways. For example, the programming for the engine(s) 202 may be processor executable instructions stored on a non-transitory machine-readable storage medium and the hardware for the engine(s) may include a processing resource (for example, one or more processors), to execute such instructions. In the present examples, the machine-readable storage medium may store instructions that, when executed by the processing resource, implement engine(s) 202. In such examples, the storage system 102 may include the machine-readable storage medium storing the instructions and the processing resource to execute the instructions, or the machine-readable storage medium may be separate but accessible to the storage system 102 and the processing resource. In other examples, engine(s) 202 may be implemented by electronic circuitry.

For example, the storage system 102 may include the I/O processing engine 108 and other engine(s) 210. The other engine(s) 210 may implement functionalities that supplement applications or functions performed by the engine(s) 202. Further, the I/O processing engine 108 may include an I/O queue allocation engine 212, storage controller managing engine 214, and temperature monitoring engine 216.

In one example implementation of the present subject matter, the I/O processing engine 108 may be associated with a host system of the storage system 102 to receive commands related to I/O operations to be performed over the storage system 102. For instance, the I/O processing engine 108 may receive host instructions from the host system for fetching data from the storage device 106. The I/O processing engine 108 may further receive data from the host system for storing on the storage device 106. The I/O processing engine 108 may further be associated with the cluster of storage controllers 104 for executing the I/O operations in the storage device 106. In one example, the I/O queue allocation engine 212 of the I/O processing engine 108 may allocate I/O queues to each of the storage controllers 206 for processing I/O operations of the associated storage namespace in the storage device 106.

In one example, the I/O queue allocation engine 212 of the I/O processing engine 108 may analyze the host instructions to determine the storage namespace for which the I/O operations have to be performed. The I/O queue allocation engine 212 may subsequently use a namespace mapping to identify the storage controller 206 associated with the determined storage namespace and route data and commands related to the I/O operation over I/O queues allocated to the storage controller 206.

In accordance to an example implementation of the present subject matter, the I/O processing engine 108 may regularly monitor operational parameters, such as load, temperature conditions and performance efficiency of the storage controllers 206. The storage controller managing engine 214 of the I/O processing engine 108 may use the operational parameters to manage storage controllers 206. For instance, the storage controller managing engine 214 of the I/O processing engine 108 may use the temperature conditions of the storage controllers 206 to identify thermal faults, such as overheating to avoid thermal throttling of the storage controllers 206. In one example, each storage controller 206 may be associated with a temperature sensor (not shown in the figure). Each temperature sensor may sense a temperature value of the corresponding storage controller 206.

In one example, the temperature monitoring engine 216 of the I/O processing engine 108 may regularly obtain, via polling, a current temperature value of each of the storage controllers 206 from the temperature sensor associated with the storage controller 206. In another example, the storage controller 106 may regularly provide an asynchronous event notification indicating the corresponding current value to the I/O processing engine 108. In one example, the temperature monitoring engine 216 of the I/O processing engine 108 may obtain the current temperature values at a predetermined time period.

In one example implementation of the present subject matter, the I/O processing engine 108 may obtain temperature data corresponding to the cluster of storage controllers 104 to identify a heated controller. The temperature data may include the current temperature value of each of the storage controllers 206 of the cluster of storage controllers 104. The storage controller managing engine 214 may compare the current temperature value of each of the storage controllers 206 with a threshold temperature value to determine if the current temperature value of any of the storage controllers exceeds the threshold temperature value. The threshold temperature value may be a temperature value less than or equal to a safe operating temperature prescribed for normal and efficient working of the storage controllers 206. In one example, the safe operating temperature may be defined by a manufacturer of the storage controllers 206. In another example, the safe operating temperature may be defined by an administrator of the storage system 102.

In one example, the storage controller managing engine 214 may identify a first storage controller, say, the storage controller 206-1 having the current temperature value greater than or equal to the threshold temperature value based on the comparison. The storage controller managing engine 214 may then select the first storage controller 206-1 as the heated controller. On determining the first storage controller 206 as the heated controller, the I/O queue allocation engine 212 may suspend the I/O queues handled by the heated controller and stop routing data and commands related to I/O operations for the storage namespace associated with the heated controller. Suspending the I/O queues handled by the heated controller may facilitate in avoiding further heating of the heated controller due to processing of the commands routed over the I/O queues handled by the heated controller.

The storage controller managing engine 214 may then select a substitute controller from the cluster of storage controllers 104 based on the temperature data. The substitute controller may be a second storage controller used to perform I/O operations of the storage namespace associated with the heated controller. In one example, the storage controller managing engine 214 may search for the substitute controller within entire cluster of the storage controllers 104. In said example, the storage controller managing engine 214 may initially rank the current temperature values corresponding to the storage controllers 206 associated with the cluster of storage controller 104 and having the current temperature value less than the threshold temperature value. The storage controller managing engine 214 may subsequently identify the storage controller 206 having the minimum current temperature value as the substitute controller.

In another example, the storage controller managing engine 214 may initially search for the substitute controller within a first sub-cluster, say, the sub-cluster 208-1 having the heated controller. In case, none of the storage controllers 206 of the first sub-cluster 208-1 is identified as the substitute controller, the storage controller managing engine 214 may search for the substitute controller within other sub-clusters 208.

In one example, to select the substitute controller, the storage controller managing engine 214 may initially determine the sub-cluster 208 of the heated controller. On determining the heated controller to be associated with the first sub-cluster 208-1, the storage controller managing engine 214 may obtain a first set of current temperature values associated with the first sub-cluster 208-1. The storage controller managing engine 214 may subsequently analyze the first set of current temperature values to determine if the first sub-cluster 208-1 includes a first set of operational storage controllers having the current temperature value less than the threshold temperature value. On determining the first sub-cluster 208-1 to include the first set of operational storage controllers the storage controller managing engine 214 may select the substitute controller from among the first set of operational storage controllers, say, the storage controllers 206-2 and 206-3.

To identify the substitute controller from among the first set of operational storage controllers 206-2 and 206-3, the storage controller managing engine 214 may initially rank the current temperature values corresponding to the first set of operational storage controllers. The storage controller managing engine 214 may then determine a minimum current temperature value based on the ranking of the current temperature values corresponding to the first set of operational storage controllers. The minimum current temperature value may be the least value among the first set of current temperature values, i.e., the current temperature values corresponding to the first set of operational storage controllers. The storage controller managing engine 214 may subsequently ascertain a second storage controller, say, the storage controller 206-3 corresponding to the minimum current temperature value as the substitute controller. Further, the storage controller managing engine 214 may select the second storage controller as the substitute controller for the heated controller.

In case the storage controller managing engine 214 determines that the first sub-cluster 208-1 does not include the first set of operational storage controllers the storage controller managing engine 214 may analyze current temperature values of the storage controllers 206 of other sub-clusters 208. In one example, the storage controller managing engine 214 may obtain a second set of current temperature values associated with a second sub-cluster, say, the sub-cluster 208-2 of the cluster of storage controllers 104. The storage controller managing engine 214 may analyze the second set of current temperature values to determine if the second sub-cluster 208-2 includes a second set of operational storage controllers having the current temperature value less than the threshold temperature value. On determining that the second sub-cluster 208-2 includes the second set of operational storage controllers, the storage controller managing engine 214 may select the substitute controller from among the second set of operational storage controllers, say, the storage controllers 206-4, 206-5, and 206-6. The storage controller managing engine 214 may thus select the second storage controller from among the second set of operational storage controllers.

In one example, to identify the substitute controller from the second set of operational storage controllers, the storage controller managing engine 214 may rank the current temperature values corresponding to the second set of operational storage controllers. The storage controller managing engine 214 may then determine the minimum current temperature value from among the current temperature values based on the ranking. In one example, the minimum current temperature value may be the least value among the second set of current temperature values. The storage controller managing engine 214 may subsequently ascertain the second storage controller, say, the storage controller 206-5 corresponding to the minimum current temperature value as the substitute controller and select the second storage controller as the substitute controller.

In one example implementation of the present subject matter, the storage controller managing engine 214 may ascertain that more than one storage controllers 206 has a minimum current temperature value. For instance, the storage controller managing engine 214 may ascertain that the second storage controller and a third storage controller have the current temperature value equal to the minimum current temperature value and can thus be used as substitute controllers. The storage controller managing engine 214 may then select the second storage controller, say, the storage controller 206-2 and the third storage controller, say, the storage controller 206-3 as a combined substitute controller.

Upon selecting the second storage controller as the substitute controller, from either of the sub-clusters 208, the storage controller managing engine 214 may associate the substitute controller with the storage namespace associated with the heated controller. Further, the I/O queue allocation engine 212 may allocate additional I/O queues to the substitute controller for processing the I/O operations for the storage namespace associated with the heated controller. Further, the I/O queue allocation engine 212 may route data and commands related to I/O operations for the storage namespace associated with the heated controller to the substitute controller using the additional I/O queues.

In case, the second storage controller and the third storage controller are selected as the combined substitute controller, the storage controller managing engine 214 may associate the second storage controller and the third storage controller with the storage namespace associated with the heated controller, as a shared storage namespace. The I/O queue allocation engine 212 may thus allocate additional I/O queues to the second storage controller and the third storage controller, as a combined substitute controller, for processing the I/O operations for the shared storage namespace. The I/O queue allocation engine 212 may further route data and commands related to I/O operations for the shared storage namespace to the second storage controller and the third storage controller using the additional I/O queues.

The I/O queue allocation engine 212 may thus to route data and commands to the substitute controller for I/O operations related to a storage namespace originally associated with the substitute controller and in addition for I/O operations related to a storage namespace originally associated with the heated controller. In one example implementation, the I/O queue allocation engine 212 may continue to route data and commands related to the I/O operations for the storage namespace associated with the heated controller to the substitute controller till the temperature value of the heated controller reduces to a value below the threshold temperature value. The temperature monitoring engine 216 may thus regularly monitor a temperature value of the heated controller to ascertain whether the temperature value of the heated controller has reduced to a value less than the threshold temperature value.

On determining that the temperature value of the heated controller has reduced to a value less than the threshold temperature value, the temperature monitoring engine 216 may request the I/O queue allocation engine 212 to activate the suspended I/O queues handled by the heated controller. The I/O queue allocation engine 212 may thus activate the suspended I/O queues and remove the additional I/O queues allocated to the substitute controller. Further, the storage controller managing engine 214 may disassociate the substitute controller from the storage namespace associated with the heated controller.

On determining that the temperature value of the heated controller is still greater than the threshold temperature value, the temperature monitoring engine 216 may continue to monitor the temperature value of the heated controller.

Figure 3:
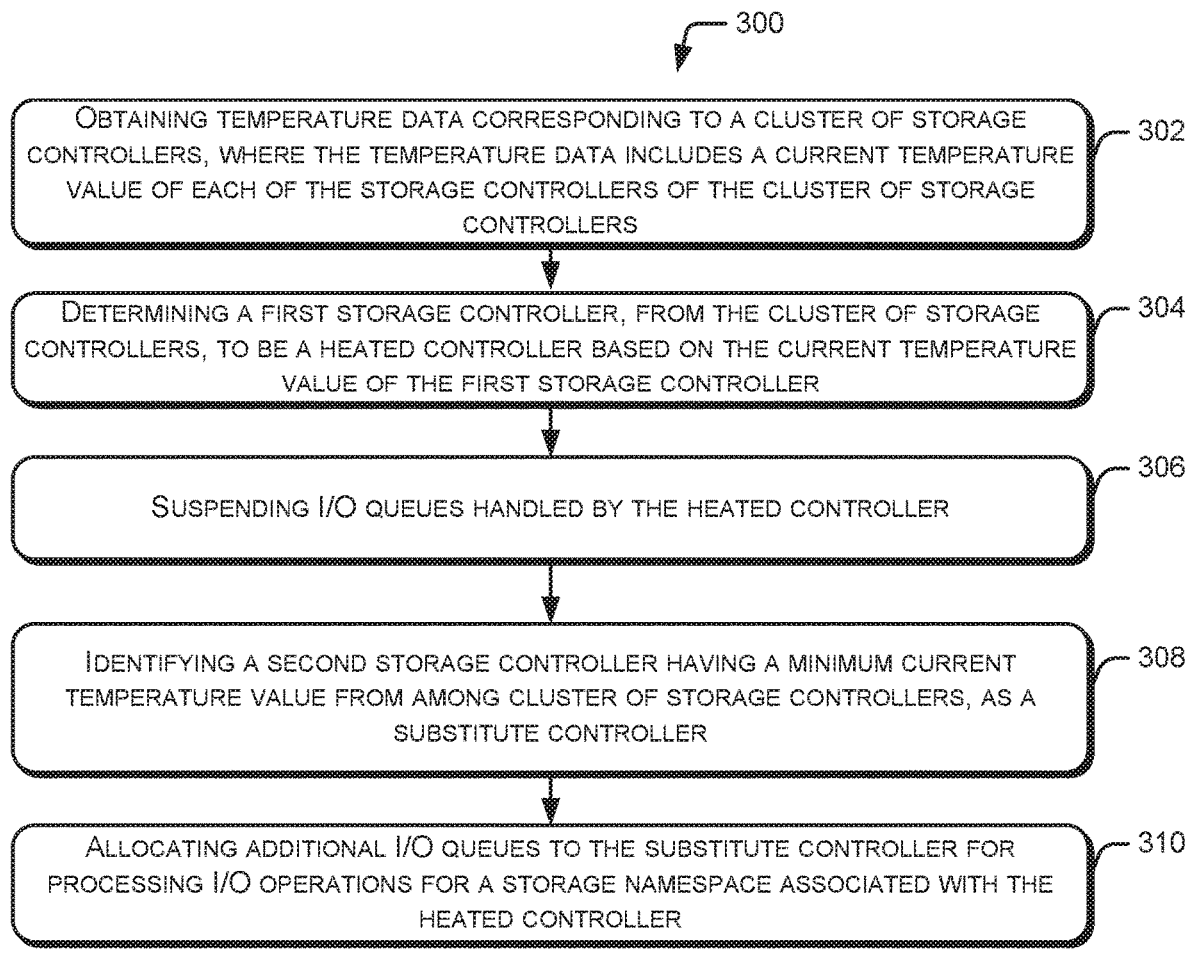
FIG. 3 illustrates a method of managing heated storage controllers associated with a cluster of storage controllers in a storage system, according to an example of the present subject matter.
Figure 4:
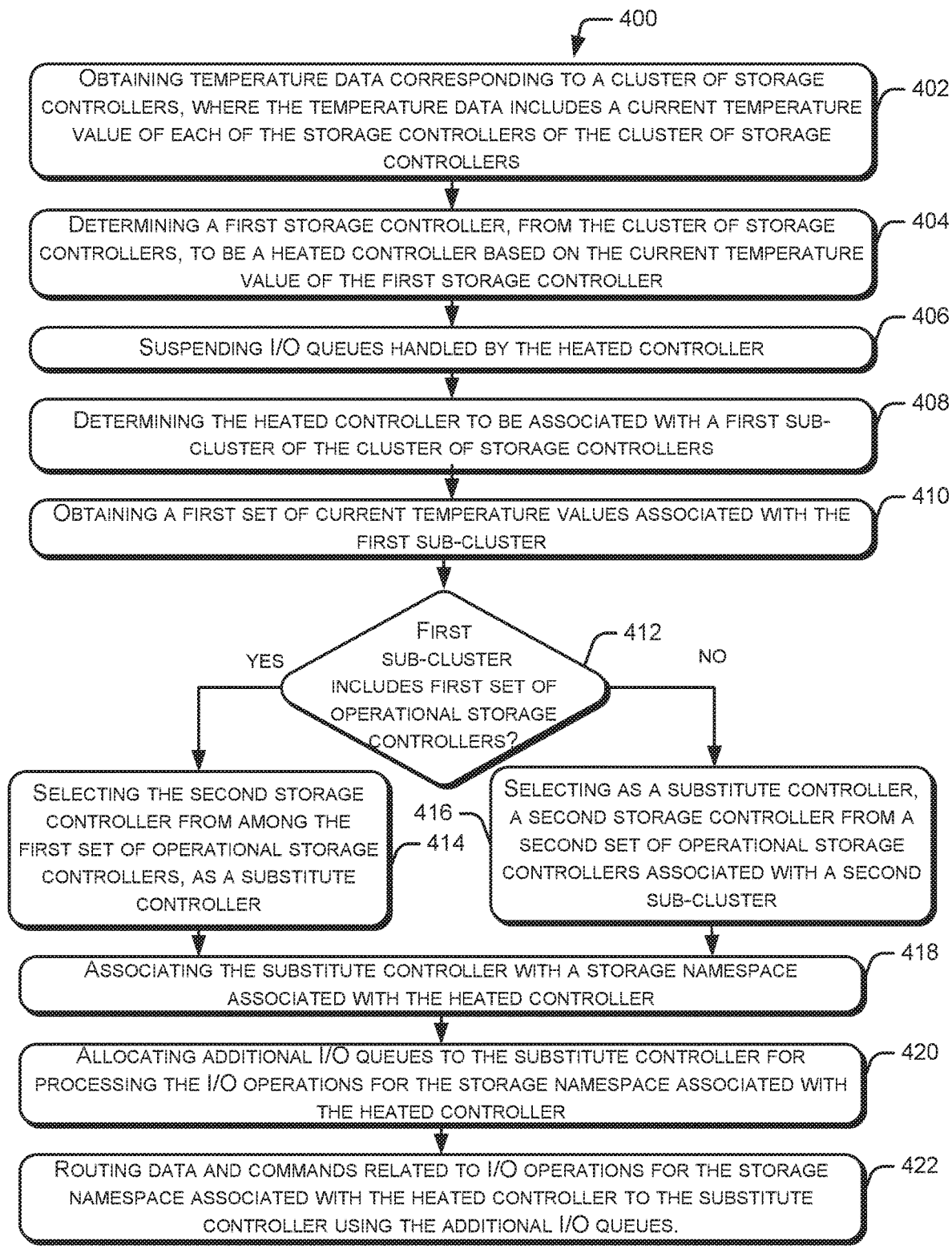
FIG. 4 illustrates a method of managing heated storage controllers associated with a cluster of storage controllers in a storage system, according to another example of the present subject matter.

FIGS. 3-4 illustrate example methods 300 and 400 respectively, for managing heated storage controllers associated with a cluster of storage controllers in a storage system. The order in which the methods are described is not intended to be construed as a limitation, and any number of the described method blocks may be combined in any order to implement the methods, or an alternative method. It may also be understood that methods 300 and 400 may be performed by a storage system as depicted in FIGS. 1 and 2. While the methods 300 and 400 are described below with reference to the storage system 102, other suitable systems for the execution of these methods may also be utilized. Additionally, implementation of these methods is not limited to such examples.

FIG. 3 illustrates the method 300 of managing heated storage controllers associated with a cluster of storage controllers in a storage system, according to an example of the present subject matter.

At block 302, temperature data corresponding to a cluster of storage controllers is obtained. In one example, the temperature data includes a current temperature value of each storage controller of the cluster of storage controllers. Further, each storage controller, from the cluster of storage controllers, is associated with a storage namespace in a storage device to processes input/output (I/O) operations corresponding to the associated storage namespace. The cluster of storage controllers, for example, the cluster of storage controllers 104 and the storage device, for example, the storage device 106 may be associated with a storage system, for example, the storage system 102.

At block 304, a first storage controller, from the cluster of storage controllers, is determined to be a heated controller based on the current temperature value of the first storage controller. In one example, the current temperature value of the first storage controller may be greater than the threshold temperature value. Further, the threshold temperature value may be a temperature value less than or equal to a safe operating temperature prescribed for normal and efficient working of the storage controllers.

At block 306, I/O queues handled by the heated controller are suspended. In one example, the I/O queues allow an I/O processing engine to route data and commands to the storage controllers for performing the I/O operations. The I/O processing engine may suspend the I/O queues handled by the heated controller to avoid further heating of the heated controller due to processing of the commands routed over the I/O queues handled by the heated controller.

At block 308, a second storage controller is identified as a substitute controller for the heated controller. In one example, the substitute controller may have a minimum current temperature value from among cluster of storage controllers. To identify the substitute controller, the I/O processing engine 108 may initially rank the current temperature values corresponding to the storage controllers having the current temperature value less than the threshold temperature value. The storage controller 206 having the minimum current temperature value may then be identified as the substitute controller.

Further, in one example, the substitute controller may be identified from within a sub-cluster, say, a first sub-cluster having the heated controller. In case none of the storage controllers of the first sub-cluster is identified as the substitute controller, a search may be performed for the substitute controller within other sub-clusters. In another example, the search for the substitute controller may be performed within entire cluster of the storage controllers. Further, in case more than one storage controllers have the minimum temperature value, all such storage controllers may be combined to operate as the substitute controller.

At block 310, additional I/O queues are allocated to the substitute controller for processing the I/O operations for the storage namespace associated with the heated controller.

FIG. 4 illustrates the method 300 of managing heated storage controllers associated with a cluster of storage controllers in a storage system, according to another example of the present subject matter.

At block 402, temperature data corresponding to a cluster of storage controllers is obtained. In one example, each storage controller, from the cluster of storage controllers, is associated with a storage namespace in a storage device to processes input/output (I/O) operations corresponding to the associated storage namespace. Further, the temperature data includes a current temperature value of each storage controller of the cluster of storage controllers. In one example, the temperature data is regularly obtained by an I/O processing engine associated with the cluster of storage controllers.

At block 404, a first storage controller, from the cluster of storage controllers, is determined to be a heated controller based on the current temperature value of the first storage controller. In one example, for each storage controller, the corresponding current temperature value is compared with a threshold temperature value to determine the first storage controller, having the current temperature value greater than the threshold temperature value, as the heated controller. The threshold temperature value may be a temperature value less than or equal to a safe operating temperature prescribed for normal and efficient working of the storage controllers.

At block 406, I/O queues handled by the heated controller are suspended. In one example, the I/O queues handled by the heated controller may be suspended to avoid further heating of the heated controller due to processing of the commands routed over the I/O queues handled by the heated controller.

At block 408, the heated controller is determined to be associated with a first sub-cluster of the cluster of storage controllers. In one example, to allocate I/O operations performed by the heated controller to another storage controller, the sub-cluster with which the heated controller is associated is identified. In one example, the sub-cluster of the heated controller may be identified based on a mapping of storage controllers and sub-clusters available with the I/O processing engine. In one example, each sub-cluster may be hosted in an individual storage bay. In another example, multiple sub-clusters may be stacked across multiple storage bays. In another example, multiple sub-clusters may be stacked in a single storage bay.

At block 410, a first set of current temperature values associated with the first sub-cluster is obtained. In one example, upon determining the heated controller to be associated with the first sub-cluster, other storage controllers clustered in the first sub-cluster are identified, for example, based on the mapping of storage controllers and sub-clusters. Subsequently, current temperature values of the other identified storage controllers are obtained from the temperature data corresponding to the cluster of storage controllers. The current temperature values of the other identified storage controllers are thus obtained as the first set of current temperature values.

At block 412, it is determined whether the first sub-cluster includes a first set of operational storage controllers having the current temperature value less than the threshold value. In one example, the first set of current temperature values is analyzed for the determination. If in case it is determined that the first sub-cluster includes the first set of operational storage controllers, ('Yes' path from block 412), the second storage controller is selected from among the first set of operational storage controllers, as the substitute controller at block 414. In one example, to identify the second storage controller from the first set of operational storage controllers, the current temperature values corresponding to the first set of operational storage controllers is initially ranked. Further, a minimum current temperature value is determined based on the ranking. Further, the minimum current temperature value is ascertained to be associated with second storage controller. The second storage controller is thus selected as the substitute controller. Further, in case two storage controllers are identified to have the temperature value equal to the minimum temperature value, both the storage controllers may be selected as the substitute controllers.

If in case it is determined that the first sub-cluster does not include the first set of operational storage controllers, ('No' path from block 412), selection of the second storage controller, as the substitute controller, is done from among a second set of operational storage controllers associated with a second sub-cluster of the cluster of storage controllers, at block 416. In one example, initially the current temperature values corresponding to the second set of operational storage controllers are ranked to determine a minimum current temperature value. Subsequently, a storage controller associated having current temperature value as the minimum current temperature value is ascertained to be second storage controller. The second storage controller is then selected as the substitute controller. Further, in case two storage controllers are identified to have the temperature value equal to the minimum temperature value, both the storage controllers may be selected as the substitute controllers.

At block 418, the substitute controller is associated with the storage namespace associated with the heated controller. Further, in case two storage controllers are identified as combined substitute controllers, the storage namespace is shared between the combined substitute controllers.

At block 420, additional I/O queues are allocated to the substitute controller for processing the I/O operations for the storage namespace associated with the heated controller.

At block 422, data and commands related to I/O operations for the storage namespace associated with the heated controller are routed to the substitute controller using the additional I/O queues. In one example, the data and commands related to the I/O operations for the storage namespace associated with the heated controller may continue to be routed to the substitute controller till the temperature value of the heated controller reduces to a value below the threshold temperature value.

Figure 5:
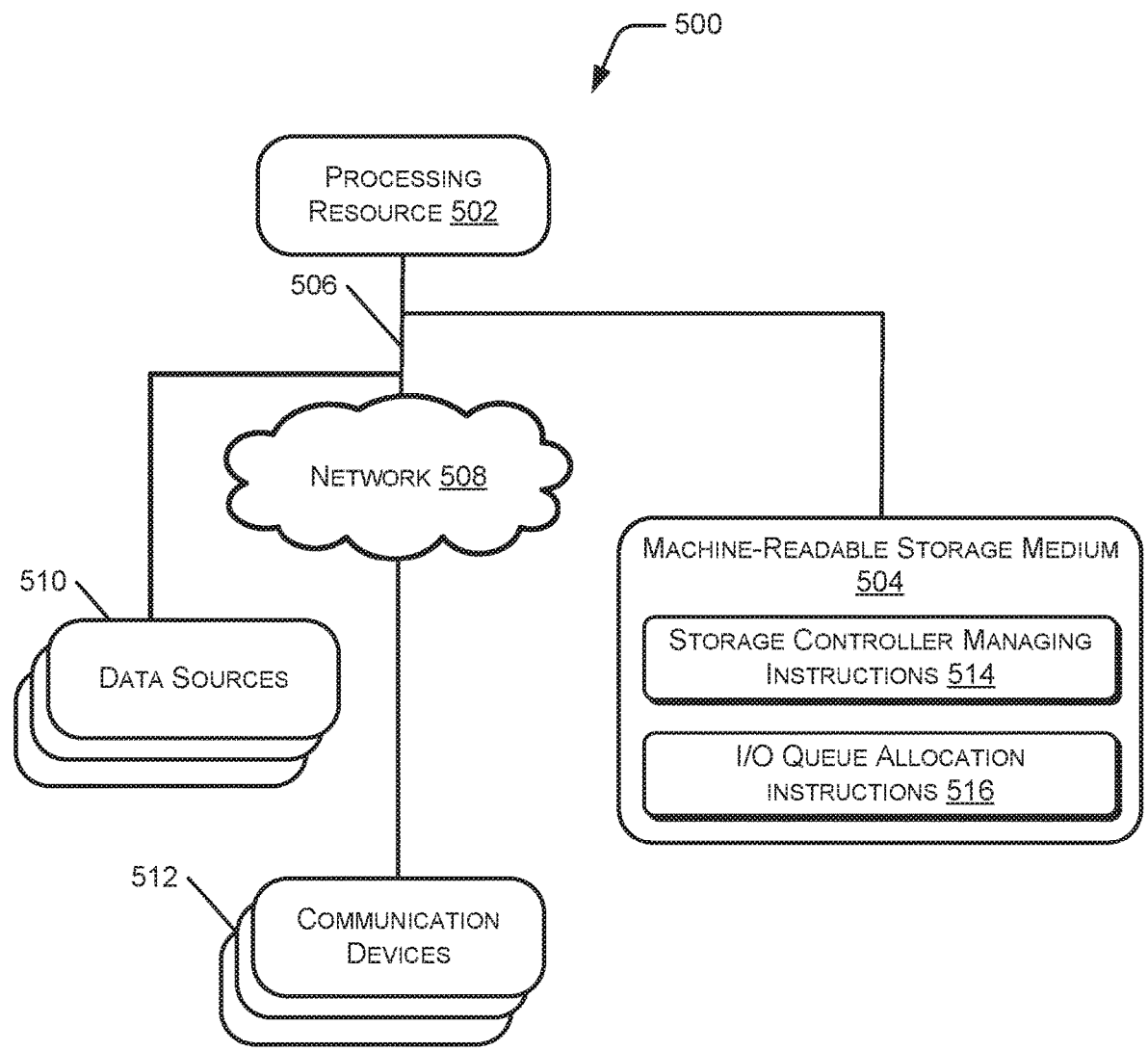
FIG. 5 illustrates a network environment implementing a non-transitory machine-readable storage medium for managing heated storage controllers associated with a cluster of storage controllers in a storage system, according to an example of the present subject matter.

FIG. 5 illustrates a network environment 500 implementing a non-transitory machine-readable storage medium including instructions executable to manage heated storage controllers associated with a cluster of storage controllers in a storage system, according to an example of the present subject matter. The network environment 500 may comprise at least a portion of a public networking environment or a private networking environment, or a combination thereof. In one implementation, the network environment 500 includes a processing resource 502 communicatively coupled to a machine-readable storage medium 504 through a communication link 506.

For example, the processing resource 502 can include processor(s) of a computing device to execute instructions (stored on a machine-readable storage medium) to manage heated storage controllers associated with a cluster of storage controllers in a storage system. The machine-readable storage medium 504 can be, for example, an internal memory device of the computing device or an external memory device. In one implementation, the communication link 506 may be a direct communication link, such as any memory read/write interface. In another implementation, the communication link 506 may be an indirect communication link, such as a network interface. In such a case, the processing resource 502 can access the machine-readable storage medium 504 through a network 508. The network 508 may be a single network or a combination of multiple networks and may use a variety of different communication protocols.

The processing resource 502 and the machine-readable storage medium 504 may also be coupled to requested data sources 510 through the communication link 506, and/or to communication devices 512 over the network 508. The coupling with the requested data sources 510 enables in receiving the requested data in an offline environment, and the coupling with the communication devices 512 enables in receiving the requested data in an online environment.

In one implementation, the machine-readable storage medium 504 includes a set of computer readable instructions, implementing storage controller managing instructions 514 and I/O queue allocation instructions 516. The set of computer readable instructions can be accessed by the processing resource 502 through the communication link 506 and subsequently executed to process requested data communicated with the requested data sources 510 in order to manage heated storage controllers. When executed by the processing resource 502, the storage controller managing instructions 514 may cause the processing resource 502 to perform the functionalities described above in relation to the storage controller managing engine 214. When executed by the processing resource 502, the I/O queue allocation instructions 516 may cause the processing resource 502 to perform the functionalities described above in relation to the I/O queue allocation engine 212.

For example, the storage controller managing instructions 514, may cause the processing resource 502 to identify a heated controller from a cluster of storage controllers based on temperature data corresponding to the cluster of storage controllers. In one example, each storage controller is associated with a storage namespace in a storage device to process input/output (I/O) operations corresponding to the associated storage namespace. The storage controller managing instructions 514, may further cause the processing resource 502 to suspend I/O queues handled by the heated controller.

Further, the storage controller managing instructions 514, may cause the processing resource 502 to identify a substitute controller, from the cluster of storage controllers, based on the temperature data. In one example, the storage controller managing instructions 514, may further cause the processing resource 502 to, associate the substitute controller with the storage namespace associated with the heated controller.

Subsequently, the I/O queue allocation instructions 516 may cause the processing resource 502 to allocate additional I/O queues to the substitute controller for processing the I/O operations for the storage namespace associated with the heated controller. The I/O queue allocation instructions 516 may further cause the processing resource 502 to route data and commands related to I/O operations for the storage namespace associated with the heated controller to the substitute controller using the additional I/O queues.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

Although examples for the present subject matter have been described in language specific to structural features and/or methods, it should be understood that the appended claims are not limited to the specific features or methods described. Rather, the specific features and methods are disclosed and explained as examples of the present subject matter. All of the features disclosed in this specification (including any accompanying claims, abstract and drawings), and/or all of the elements of any method or process so disclosed, may be combined in any combination, except combinations where at least some of such features and/or elements are mutually exclusive.

We claim:

1. A storage system comprising:
   a cluster of storage controllers, wherein each storage controller is associated with a storage namespace, and wherein each storage controller is to process input/output ((I/O) operations corresponding to the associated storage namespace;
   a processing resource; and
   a non-transitory machine-readable storage medium comprising instructions executable by the processing resource to:
      allocate I/O queues to each of the storage controllers from the cluster of storage controllers for processing I/O operations of the associated storage namespace;
      identify a heated controller from the cluster of storage controllers based on temperature data corresponding to the cluster of storage controllers;
      suspend I/O queues handled by the heated controller;
      select a substitute controller, from the cluster of storage controllers, based on the temperature data;
      associate the substitute controller h the storage namespace associated with the heated controller; and
      allocate additional I/O queues to the substitute controller for processing the I/O operations for the storage namespace associated with the heated controller.

2. The storage system as claimed in claim 1, wherein the instructions are executable by the processing resource to route data and commands related to I/O operations for the storage namespace associated with the heated controller to the substitute controller using the additional I/O queues.

3. The storage system as claimed in claim 1, wherein the instructions are executable by the processing resource to:
   obtain the temperature data corresponding to the cluster of storage controllers, wherein the temperature data includes a current temperature value of each of the storage controllers of the cluster of storage controllers;
   compare, for each storage controller, the corresponding current temperature value with a threshold temperature value; and
   identify a first storage controller having the current temperature value greater than the threshold temperature value based on the comparison; and
   select the first storage controller as the heated controller.

4. The storage system as claimed in claim 1, wherein the instructions are executable by the processing resource to:
   monitor a temperature value of the heated controller to ascertain whether the temperature value of the heated controller has reduced to a value less than a threshold temperature value;
   activate the suspended I/O queues handled by the heated controller upon the temperature value becoming less than the threshold temperature value; and
   disassociate the substitute controller from the storage namespace associated with the heated controller.

5. The storage system as claimed in claim 1, wherein the cluster of storage controllers further comprises sub-clusters of storage controllers, wherein the instructions are executable by the processing resource to:
   determine the heated controller to be associated with a first sub-cluster;
   obtain a first set of current temperature values associated with the first sub-cluster;
   analyze the first set of current temperature values to determine if the first sub-cluster includes a first set of operational storage controllers each having a current temperature value, among the current temperature values, that is a less than a threshold temperature value; and
   on determining the first sub-cluster to include the first set of operational storage controllers, select the substitute controller from among the first set of operational storage controllers.

6. The storage system as claimed in claim 5, wherein on determining the first sub-cluster to not include the first set of operational storage controllers, the instructions are executable by the processing resource to:
   obtain a second set of current temperature values associated with a second sub-cluster of the duster of storage controllers;
   analyze the second set of current temperature values to determine if the second sub-cluster includes a second set of operational storage controllers each having a current temperature value, among the second set of current temperature values, that is less than the threshold temperature value; and
   on determining the second sub-cluster to include the second set of operational storage controllers, select, as the substitute controller, a second storage controller from among the second set of operational storage controllers.

7. The storage system as claimed in claim 6, wherein the instructions are executable by the processing resource to:
   rank the current temperature values corresponding to the second set of operational storage controllers;
   determine a minimum current temperature value based on the ranking;
   ascertain a second storage controller corresponding to the minimum current temperature value as the substitute controller; and
   select the second storage controller as the substitute controller.

8. The storage system as claimed in claim 5, wherein the instructions are executable by the processing resource to:
   rank the current temperature values corresponding to the first set of operational storage controllers;

determine a minimum current temperature value based on the ranking; and
ascertain a second storage controller corresponding to the minimum current temperature value as the substitute controller; and
select the second storage controller as the substitute controller.

9. The storage system as claimed in claim 5, wherein the instructions are executable by the processing resource to:
ascertain a second storage controller and a third storage controller having a minimum current temperature value from the among the duster of storage controllers;
select the second storage controller and the third storage controller as a combined substitute controller;
associate the second storage controller and the third storage controller with the storage namespace associated with the heated controller;
allocate additional I/O queues to the second storage controller and the third storage controller, as the combined substitute controller, for processing the I/O operations for the storage namespace associated with the heated controller; and
route data and commands related to I/O operations for the storage namespace associated with the heated controller to the second storage controller and the third storage controller using the additional I/O queues.

10. The storage system as claimed in claim 1, wherein the storage controllers are implemented using virtual host bus adapters implementing a Non-Volatile Memory (NVM) Express (NVMe) Flash protocol.

11. A method comprising:
obtaining temperature data corresponding to a cluster of storage controllers, wherein each storage controller; from the cluster of storage controllers, is associated with a storage namespace to process input/output (I/O) operations corresponding to the associated storage namespace, and wherein the temperature data includes a current temperature value of each of the storage controllers of the cluster of storage controllers;
determining a first storage controller, from the cluster of storage controllers, to be a heated controller based on the current temperature value of the first storage controller;
suspending I/O queues handled by the heated controller;
identifying a second storage controller having a minimum current temperature value from among duster of storage controllers, as a substitute controller; and
allocating additional I/O queues to the substitute controller for processing the I/O operations for the storage namespace associated with the heated controller.

12. The method as claimed in claim 11, wherein the method further comprises:
associating the substitute controller with the storage namespace associated with the heated controller; and
routing data and commands related to I/O operations for the storage namespace associated with the heated controller to the substitute controller using the additional I/O queues.

13. The method as claimed in claim 11, wherein identifying the heated controller further comprises:
comparing, for each storage controller, the corresponding current temperature value with a threshold temperature value to determine the first storage controller, having the current temperature value greater than the threshold temperature value, as the heated controller.

14. The method as claimed in claim 11, wherein identifying the substitute controller further comprises:
determining the heated controller to be associated with a first sub-duster of the duster of storage controllers;
obtaining a first set of current temperature values associated with the first sub-cluster;
analyzing the first set of current temperature values to determine if the first sub-duster includes a first set of operational storage controllers each having a current temperature value, among the first set of current temperature values, that is less than a threshold value;
on determining the first sub-duster to include the first set of operational storage controllers, selecting the second storage controller from among the first set of operational storage controllers, as the substitute controller; and
on determining the first sub-duster to not include the first set of operational storage controllers, selecting, as the substitute controller, the second storage controller from among a second set of operational storage controllers associated with a second sub-duster of the duster of storage controllers.

15. The method as claimed in claim 13, wherein identifying the second storage controller as the substitute controller, from the first set of operational storage controllers, comprises:
ranking the current temperature values corresponding to the first set of operational storage controllers;
determining a minimum current temperature value based on the ranking;
ascertaining the minimum current temperature value to be associated with second storage controller; and
selecting the second storage controller as the substitute controller.

16. The method as claimed in claim 14, wherein identifying the second storage controller as the substitute controller, from the second set of operational storage controllers, comprises:
ranking the current temperature values corresponding to the second set of operational storage controllers;
determining a minimum current temperature value based on the ranking;
ascertaining the minimum current temperature value to be associated with the second storage controller; and
selecting the second storage controller as the substitute controller.

17. A non-transitory machine-readable storage medium having a set of computer readable instructions that, when executed, cause a processor to:
identify a heated controller from a duster of storage controllers based on temperature data corresponding to the duster of storage controllers, wherein each storage controller is associated with a storage namespace to process input/output (I/O) operations corresponding to the associated storage namespace;
suspend I/O queues handled by the heated controller;
identify a substitute controller, from the duster of storage controllers, based on the temperature data;
associate the substitute controller with the storage namespace associated with the heated controller;
allocate additional I/O queues to the substitute controller for processing the I/O operations for the storage namespace associated with the heated controller; and
route data and commands related to I/O operations for the storage namespace associated with the heated controller to the substitute controller using the additional I/O queues.

18. The machine-readable storage medium as claimed in claim 17, wherein the computer readable instructions, when executed, further cause the processor to:

obtain temperature data corresponding to the cluster of storage controllers, wherein the temperature data includes a current temperature value of each of the storage controllers of the cluster of storage controllers;

compare, for each storage controller, the corresponding current temperature value with a threshold temperature value; and identify a first storage controller having a respective one of the current temperature values greater than the threshold temperature value based on the comparison; and select the first storage controller as the heated controller.

19. The machine-readable storage medium as claimed in claim 18, wherein the computer readable instructions, when executed, further cause the processor to:

rank the current temperature values corresponding to the storage controllers having respective current temperature values less than the threshold temperature value;

determine a minimum current temperature value based on the ranking; and identify the storage controller corresponding to the minimum current temperature value as the substitute controller.

20. The machine-readable storage medium as claimed in claim 17, wherein the computer readable instructions, when executed; further cause the processor to, monitor a temperature value of the heated controller to ascertain whether the temperature value of the heated controller has reduced to a value less than a threshold temperature value;

activate the suspended I/O queues handled by the heated controller; and disassociate the substitute controller from the storage namespace associated with the heated controller.

* * * * *